United States Patent [19]
True et al.

[11] 3,806,636
[45] Apr. 23, 1974

[54] LIGHT VALVE PROJECTOR WITH REDUCED CROSS-COUPLING BETWEEN COLORS

[75] Inventors: Thomas T. True, Camillus; William C. Bates, Baldwinsville, both of N.Y.

[73] Assignee: General Electric Company, Syracuse, N.Y.

[22] Filed: Nov. 15, 1972

[21] Appl. No.: 306,616

[52] U.S. Cl. .......................... 178/5.4 BD
[51] Int. Cl. .............................. H04n 9/12
[58] Field of Search ....... 178/5.4 BD, 5.4 ES, 5.4 E, 178/5.4 AC; 350/161, 162 R

[56] References Cited
UNITED STATES PATENTS
3,730,992   5/1973   True .............................. 178/5.4 BD Primary Examiner—Richard Murray
Attorney, Agent, or Firm—Marvin Snyder

[57] ABSTRACT

Cross-coupling of red, blue or magenta light into the green portion of an image produced by a light valve projector is greatly reduced by limiting the maximum slope of the walls forming the ends of portions of the green diffraction grating to a value which avoids excessive refraction. This is accomplished by altering the passband of the modulated carrier producing the green diffraction grating such that, for high video frequencies, single sideband modulation occurs. Alternatively, the slew rate of the video signal modulating the carrier producing the green diffraction grating may be limited.

9 Claims, 7 Drawing Figures

LIGHT VALVE PROJECTOR WITH REDUCED CROSS-COUPLING BETWEEN COLORS

This invention relates to light valves for optically projecting, in color, images generated electronically on a light controlling layer, and more particularly to a method and apparatus for preventing cross-coupling of red, blue or magenta light into the green portion of an image thus projected.

One form of light valve suitable for optical projection of electronically generated images onto a remote display surface comprises an evacuated enclosure containing an electron gun in predetermined alignment with a transparent disk. The disk is rotated through a reservoir of light modulating fluid to deposit a continuously-replenished layer of fluid on the disk surface. An electron beam, generated by the electron gun, is directed through electrostatic beam deflecting and focusing means and is scanned across a portion of the light modulating fluid layer so as to selectively deform the layer. The fluid deformations thus formed constitute optical diffraction gratings which, in conjunction with a Schlieren optical system, selectively control passage of light from a light source through the disk and through an output window in the enclosure envelope in order to create visible images at the remote display surface on which the light impinges.

In particular, diffraction gratings are formed by directing the electron beam onto the fluid layer and horizontally deflecting the beam across the surface of the layer in successive, substantially parallel paths. By velocity modulating the beam with signals corresponding to two primary colors, typically red and blue, horizontal deflection speed along these paths is varied in a periodic manner at a frequency considerably greater than frequency of occurrence of each scan line or parallel path, producing alterations in electrical charge deposited on the fluid layer by the beam when moving along these paths. Concentrations of electrical charge along these paths are attracted to the transparent disk, which is electrically conductive and maintained positive with respect to the electron beam source, to form valleys in the fluid layer substantially orthogonal to the direction of the scanning paths. Hence, as deflection speed of the electron beam across the surface of the fluid layer is varied, depth of the valleys formed is correspondingly changed. As a result, rays of red or blue light impinging on the layer surface are diffracted in planes normal to the longitudinal direction of the valleys in the fluid layer, the diffraction angle being determined by spacing between adjacent valleys. Intensity of light thus diffracted is a function of depth of the valleys. Additionally, horizontally directed diffraction gratings, corresponding to the green signal, are formed by the horizontal scan lines or parallel paths of the scanning electron beam. While the vertically directed diffraction gratings are velocity modulated, the horizontally directed diffraction gratings are wobble modulated; that is, vertical size of the spot formed by the beam is varied in accordance with green signal modulation. Accordingly, rays of green light impinging on the layer surface are diffracted in planes normal to the horizontal scan lines in the fluid layer, the diffraction angle being determined by spacings between adjacent horizontal scan lines. Intensity of the light thus diffracted is a function of depth of the horizontal scan lines.

The electron beam employed in the system is modulated by a plurality of carrier waves of different, substantially constant frequencies, each frequency corresponding to a respective color component of the image to be displayed. Each of the carrier waves, in turn, is amplitude modulated in accordance with an electrical signal corresponding to intensity of the respective color component to form a plurality of superimposed diffraction gratings, each grating having a different line-to-line spacing corresponding to a respective primary color. Depth of the gratings is thereby varied in accordance with amplitude of the respective color components. A system of this type is described and claimed in W. E. Good et al. U.S. Pat. No. 3,325,592, issued June 13, 1967 and assigned to the instant assignee.

Depth of fluid layer deformation in each diffraction grating is varied in accordance with density of charge deposited by the electron beam so as to produce corresponding variations in intensity of light passed by the diffraction grating. Light emerging from the diffraction gratings is directed onto an output mask having apertures of predetermined extent and at predetermined locations in order to pass the selected primary color components of the image to be displayed. Thus, in order to project three primary colors from a common layer of viscous fluid, the electron beam is made to produce a set of diffraction gratings thereon, each grating corresponding to a respective primary color. The line-to-line spacing of each diffraction grating is different from that of each of the other gratings, thus producing a different angle of light deviation for any given color impinging on the fluid layer. Line-to-line spacing of each of the three primary color diffraction gratings is used to determine correct width and location of the corresponding slot in the output mask to pass the respective primary color component when a diffraction grating corresponding to that color has been formed on the fluid layer.

The arrangement of the slots and bars of the output mask is such that green light is passed through horizontal slots and blocked by horizonal bars, while red, blue and magenta light is passed through vertical slots and blocked by vertical bars. However, any disturbance which produces horizontal diffraction or refraction also produces red, blue or magenta light in the projected image. When a broad area green image is displayed, the diffraction produced by the horizontal valleys is in a vertical direction, so that no red, blue or magenta light appears in the green image. In such instance, control of green display can be accomplished independently of the red, blue and magenta display so as to produce insignificant spurious cross-coupling interaction. However, when green alphanumeric images or small green images are to be displayed, the horizontal valleys are interrupted in accordance with the video signal containing green image information, and are made discontinuous in the horizontal direction. These discontinuities cause horizontal refraction, producing spurious magenta light in the displayed image. The net result of this interaction is that small green alphanumerics, small green images or portions thereof, and lines of transition between green and other colors, all turn toward magenta color or white.

The aforementioned undesirable effects occur as a result of light entering the fluid being refracted at the fluid-vacuum interface occurring at the wedges of fluid defined by the walls of the fluid in the green diffraction grating at either side of an interruption therein and the surface of the transparent disk adjacent the fluid. In accordance with the invention, a dramatic reduction in the degree of red, blue and magenta crosscoupling has now been accomplished by limiting the maximum horizontal slewing rate, or horizontal wedge angle, of the green grooves, that is, by limiting the maximum slope, or steepness of the wall defining one surface of the wedge of fluid at either end of the interruptions in the green diffraction grating, less spurious red, blue and magenta light appears in the green portions of the image. Whenever such wedge exists in the green diffraction grating, it has no effect on red, blue or magenta light until the deviation due to refraction is so large that the light, which would otherwise be blocked by a vertical bar of the output mask, passes through a vertical slot thereof. By limiting the steepness of the sloping side of such wedge, this spurious, refracted light can be made to impinge only on a vertical bar of the output mask, thereby insuring that undesired red, blue or magenta light does not interfere with green portions of the image. This limitation can be achieved without any noticeable deterioration in the red, blue and magenta portions of the image, as well as in the green portions of the image.

Accordingly, one object of the invention is to reduce cross-coupling of red, blue or magenta light in green portions of the image produced by a light valve video projector employing diffraction gratings of orthogonal orientation to produce colored images for display.

Another object is to limit the effect of light horizontally refracted through the sloping walls at either end of interactions and disturbances in a horizontal diffraction grating upon light diffracted vertically by the grating in a light valve of a video projector.

Another object is to provide apparatus for limiting the horizontal slewing rate of the green video signal in a light valve video projector.

Briefly, in accordance with a preferred embodiment of the invention, an optical projection system for displaying images in color by impinging an electron beam on a deformable light modulating medium situated between the input and output masks of a Schlieren optics system is described. The electron beam forms optical diffraction gratings in the form of grooves in the medium extending in a first direction representing first and second primary colors and extending in a second direction representing a third primary color. A source of light comprised of first, second and third primary colors is directed through transparent regions of the input mask onto the diffraction gratings and thence onto the output mask. At least portions of the image in the third primary color without substantial crosscoupling of either of the first and second primary colors are displayed by limiting to less than a predetermined value the slope of walls in the medium occurring at locations in the grooves extending in the second direction and representing transitions in the third primary color of the image. The walls extend in the first direction so that light refracted by the walls is blocked by the output mask of the schlieren optics system.

In accordance with another preferred embodiment of the invention, an optical projection system including a light valve containing a light modulating medium situated between the input mask and output mask of a Schlieren optics system employs an amplitude modulator wherein an electrical carrier corresponding to a particular one of a plurality of primary colors is amplitude modulated by video information for that color. Frequency selecting means couple the output of the amplitude modulator to apparatus for deflecting an electron beam directed onto the surface of the light modulating medium so as to prevent the slewing rate of the beam, when forming a diffraction grating to modulate light of the particular one of the primary colors, from exceeding a predetermined level. By thus limiting the slewing rate, light refracted through the sloping sides of the fluid at either end of interruptions and disturbances in the grating diffracting light of the particular one of the primary colors is blocked by the output mask of the Schlieren optics system and thereby prevented from interfering with the desired light of the particular one of the primary colors.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which:

DESCRIPTION OF TYPICAL EMBODIMENTS

Figure 1:
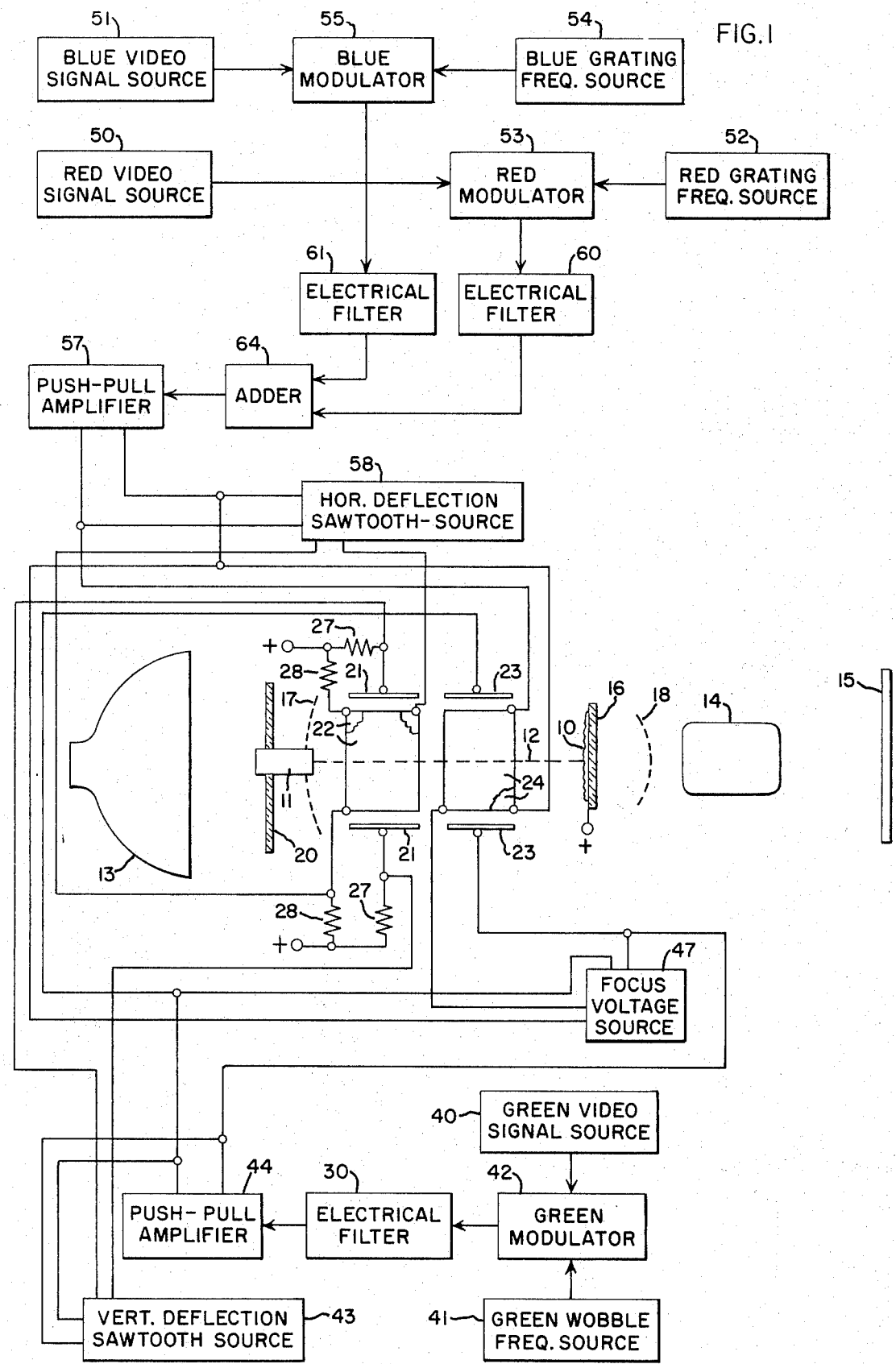
FIG. 1 is a schematic diagram of an optical projection system employing the apparatus of the instant invention.

FIG. 1 illustrates a colored optical image projection system including a light modulating medium 10, such as a fluid of the type described in H.E. Towlson U.S. Pat. No. 3,385,991, issued May 28, 1968 and assigned to the instant assignee, and an electron beam generating device 11, such as an electron gun, producing an electron beam 12 which impinges on medium 10. Medium 10 is supported on an optically transparent substrate 16. Light from a light source 13 is directed onto light modulating medium 10, and light emergent from medium 10 is focused by a projection lens 14 onto a remote screen 15 on which the projected image is displayed. In order to obtain light of the desired characteristics, additional optical elements such as lenticular lenses are employed in the system but, for ease in understanding the invention, are omitted from the description herein. Examples of suitable optical elements for use with the present invention are shown and described in W. E. Good et al. U.S. Pat. No. 3,290,436, issued Dec. 6, 1966, and W. E. Good et al. U.S. Pat. No. 3,330,908, issued July 11, 1967, both of which patents are assigned to the instant assignee.

An apertured light mask 17 is situated on the light input side of light modulating medium 10, while a second apertured light mask 18 is situated on the light output side of light modulating medium 10. Output light mask 18 is comprised of a geometrical configuration of the type illustrated in FIG. 2 and described in detail infra; that is, a plurality of vertically extending parallel slots and opaque bars are situated in the central portion of each mask, and a plurality of horizontally extending parallel slots and opaque bars are situated on either side of the central portion of the mask. Input light mask 17 is of geometrical configuration similar to that of output light mask 18, except that the input mask has slots where the output mask has bars, and vice versa. A generally circular color filter 20, situated between light source 13 and input mask 17, is constructed with a vertically oriented central portion, corresponding to the central portion of masks 17 and 18, adapted to pass substantially only the red and blue, or magenta components of white light, and with segments on either side of the central portion, corresponding to regions of masks 17 and 18 containing the horizontal slots and bars, adapted to pass only the green component of white light.

Light-modulating medium 10, with its surface adjacent substrate 16 maintained at positive potential so as to act as an accelerating electrode for electrons emitted by electron gun 11, is deformable by impingement of electron beam 12 thereon. The electron beam is controlled by a pair of vertical deflection plates 21, a pair of horizontal deflection plates 22, a pair of vertical focus and deflection electrodes 23, and a pair of horizontal focus and deflection electrodes 24. AC voltage is carried on the focus and deflection electrodes and the deflection plates, while the focus and deflection electrodes also carry DC voltage in order to maintain the electron beam at a small cross section (a fraction of a mil in diameter). Each of deflection plates 21 and 22 is coupled to a positive potential through a resistance 27 and 28, respectively, so as to prevent any charge build up on deflection plates 21 and 22 which would interfere with their performing an electron beam deflection function.

Electron beam deflection voltages, which produce the information necessary for electron beam 12 to deform medium 10 in a manner enabling display of the desired image on remote screen 15, are derived from a received video signal by apparatus designated red video signal source 50, blue video signal source 51, and green video signal source 40. Instantaneous amplitude of the signal produced by each of these signal sources corresponds, respectively, to intensity of an element of the respective color in a television image to be projected on screen 50. In addition, signals of constant frequency and constant amplitude are generated by each of a red grating frequency source 52, a blue grating frequency source 54, and a green wobble frequency source 41, and comprise a carrier signal furnished to each of a red amplitude modulator 53, a blue amplitude modulator 55, and a green amplitude modulator 42, respectively. Each of amplitude modulators 53, 55 and 42 is of the double sideband type, or type which generates both upper and lower sidebands, as well as the carrier, at its respective output.

Output signals from red video signal source 50 are furnished to red modulator 53, so as to modulate the red grating signal applied thereto. Similarly, output signals from blue video signal source 51 are furnished to blue modulator 55, so as to modulate the blue grating signal applied thereto, while output signals from green video signal source 40 are furnished to green modulator 42, so as to modulate the green grating signal applied thereto. The outputs of each of red modulator 53 and blue modulator 55 are coupled, respectively, by a pair of electrical filters 60 and 61, respectively, to respective inputs of a 2-input adder circuit 64. Similarly, the output of green modulator 42 is coupled to a push-pull amplifier 44 through an electrical filter 30.

Adder circuit 64 algebraically sums the signals received from electrical filters 60 and 61, and furnishes the resultant signal to push-pull amplifier 57. Output signals of amplifier 57, together with output signals of predetermined amplitude produced by a horizontal deflection sawtooth voltage source 58, are applied to horizontal focus and deflection electrodes 24. Output signals of lower amplitude produced by horizontal deflection sawtooth voltage source 58 are also applied to horizontal deflection plates 22. In similar fashion, the output of push-pull amplifier 44 is coupled to vertical focus and deflection electrodes 23. Additionally, a vertical deflection sawtooth voltage source 43 is applied at a predetermined amplitude of signal to vertical focus and deflection electrodes 23 and, at a lower amplitude of signal, to vertical deflection plates 21. A focus voltage source 47 furnishes electrical potentials of the proper amplitudes to focus and deflection electrodes 23 and 24 in order to maintain electron beam 12 at the desired focus.

In operation, electron beam 12 is swept, in raster fashion, along the surface of deformable medium 10 by the potentials applied to deflection plates 21 and 22 and focus and deflection electrodes 23 and 24. The beam is swept in a horizontal direction by the voltage produced by horizontal deflection sawtooth voltage source 58 and applied to horizontal deflection plates 22 and focus and deflection electrodes 24, and in a vertical direction by the voltage produced by vertical deflection sawtooth voltage source 43 and applied to vertical deflection plates 21 and focus and deflection electrodes 23. During horizontal and vertical retrace intervals, the electron beam is blanked by circuitry which, for ease in understanding the invention, is not shown.

Impingement of the electron beam on deformable medium 10 causes formation of a depression in the medium because of electrostatic forces resulting from the electrical potential thus produced across the medium at the point where the electron beam has struck. As the beam is swept horizontally, the combined signal corresponding to the red video signal amplitude-modulated on a red carrier and filtered, plus the blue video signal amplitude-modulated on a blue carrier and filtered, is applied to focus and deflection electrodes 24 from push-pull amplifier 57. These signals are thereby superimposed upon the horizontal deflection field, causing horizontal movement of the electron beam to occur at a controllably varying speed. This type of electron beam deflection is known in the art as velocity modulation.

As a result of this velocity modulation, horizontal motion of the electron beam exhibits intervals in which the motion is alternately slowed and accelerated. As the beam is swept horizontally, a narrow channel is formed in deformable medium 10 along the path of the beam, due to electrical charge deposition on the surface of the medium. Depth of the channel depends on speed at which the beam is moved; that is, when the beam is deflected rapidly, less charge is deposited along its path than when the beam is deflected more slowly. As amount of charge per unit length along the path of the beam increases, depth of the channel thus formed also increases, and vice versa.

During each of the slowed motion portions of electron beam horizontal motion, sufficient additional charge is deposited on the surface of deformable medium 10 to cause formation of a depression along the channel being formed by the beam. Since horizontal motion of the electron beam is altered in identical fashion during each horizontal sweep of a raster line, and since maximum and minimum horizontal speeds of the electron beam occur alternately at equal time intervals, then for each carrier frequency produced by a grating frequency source and furnished to push-pull amplifier 57, a plurality of equally spaced vertical columns of depressions in deformable medium 10 is produced. These columns thus form valleys in the deformable medium so as to comprise vertical optical diffraction gratings. Intensity of light diffracted by the vertical optical diffraction gratings is controlled by depth of the depressions along the horizontal channels in deformable medium 10 which, in turn, is determined by amplitude of the carrier or grating frequency producing the depressions. Since depth of deformation determines intensity of light produced on screen 15, the red and blue video signal sources thus control amplitude of the red and blue light, respectively, produced on the screen.

The green component of light passed by deformable medium 10 is determined by the signal from green video signal source 40 which, in modulator 42, amplitude modulates the carrier produced by green wobble frequency source 41. The output signal of modulator 42 exhibits a constant frequency equal to the carrier frequency of the green wobble frequency source, which produces the green diffraction grating, and an amplitude varying inversely with amplitude of green video signal source 40. The output signal of modulator 42, passed through electrical filter 30 and amplified by push-pull amplifier 44, is superimposed on the vertical deflection voltage produced by vertical deflection sawtooth source 43 and applied to focus and deflection electrodes 23, causing the electron beam to "wobble," or oscillate vertically for controllably variable distances in either direction at a periodic rate. A uniform spreading or smearing of the charge deposited by the electron beam thus occurs in a direction transverse to the horizontal scanning direction of the beam. With an increase in green video signal amplitude, green carrier amplitude is reduced and more charge is concentrated along the center of the horizontal scanning direction, resulting in a deeper channel in light modulating medium 10 along the portion of the horizontal scanning line being produced at that time. Accordingly, the natural horizontal diffraction grating formed by channels produced by the focused electron beam sweeping in a horizontal direction represents a maximum green modulation, or light field, and the defocusing during lower amplitude green video signals tends to spread or smear the grating by widening the horizontal channels. For good green dark field, the horizontal diffraction grating is virtually wiped out. Maximum amplitude of wobble is limited to the value required for optimum dark field.

White light from light source 13 is projected onto color filter plate 20 which passes only magenta light through its central zone and only green light through sectorial zones at either side of its central zone. The light thus segregated by the color filter plate is passed through input mask 17 and focused on the raster area of deformable medium 10 by lenses (not shown).

During presence of uniform charge on its surface, oil film 10 is smooth. However, due to the action of electron beam 12 as it scans over the surface of deformable medium 10, electrical charge is deposited in the previously described manner in order to form three optical diffraction gratings. Two of the diffraction gratings thus formed are vertically disposed and serve to diffract the red and blue portions of the light spectrum, respectively. The third grating is horizontally disposed and serves to diffract the green portion of the light spectrum. The three superimposed diffraction gratings thus define the image to be projected on remote display surface 15.

Light from the diffraction gratings on deformable medium 10 is passed through output light mask 18 which, as previously noted, is made complementary in configuration to input mask 17. In absence of gratings on deformable medium 10, the slots of input mask 17 are imaged onto the bars of output mask 18. When diffraction gratings are formed on deformable medium 10, light is deviated by the gratings so as to pass through the slots of output mask 18. Light emerging from the slots of output mask 18 is projected by projection lens 14 onto remote display surface 15, forming an image corresponding to the electrical signals producing deformations in deformable medium 10. That is, since the slots and bars of masks 17 and 18 are oriented with respect to each other in a predetermined manner, and since light of various diffraction orders is passed in accordance with diffration grating geometry, controlled portions of the optical spectrum pass through the grating and mask arrangement to facilitate their optical assembly by projection lens 14 onto display screen 15.

Figure 2:
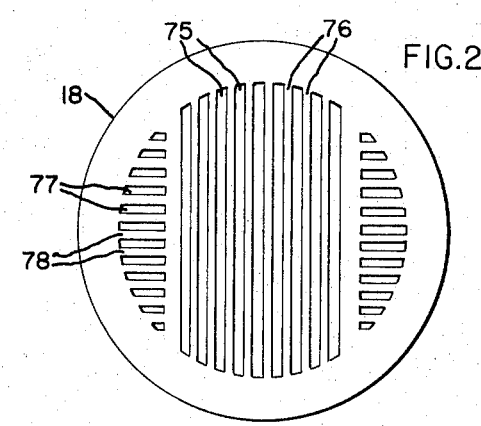
FIG. 2 is a plan view of a typical light output mask employed in the projection system of FIG. 1.

FIG. 2 illustrates an example of output mask 18, showing the centrally located vertical slots 75 separated by vertical bars 76, and the sectorially located horizontal slots 77 separated by horizontal bars 78. Input mask 17 resembles output mask 18, with the exception that the slots and bars are interchanged. Accordingly, in the input mask, regions 75 would comprise vertical bars and regions 76 would comprise vertical slots, while regions 77 would comprise horizontal bars and regions 78 would comprise horizontal slots.

As described in copending T. True application Ser. No. 99,058, filed Dec. 17, 1970, now U.S. Pat. No. 3,730,992, issued May 1, 1973 and assigned to the instant assignee, a pair of electrical filters 60 and 61 are employed to increase the relative energy in the upper sideband of the red signal and the lower sideband of the blue signal, respectively, in order to provide increased brightness and improved small area contrast with greater picture detail information. Nevertheless, such improvements do not bring about any detectable decrease in cross-coupling of red, blue or magenta light onto green images. It has now been determined that this cross-coupling can be diminished by employing electrical filter 30, as shown in FIG. 1, between the output of green modulator 42 and the input to push-pull amplifier 44. The purpose of filter 30 is to minimize the rate of change in amplitude, or slew rate, of the signal coupled to vertical deflection plates 21 and vertical focus and deflection electrodes 23.

As the electron beam is swept in the horizontal direction, green information furnished thereto causes changes in the degree of focus of the electron beam. Thus, where the beam abruptly goes from a region of high green modulation to low green modulation, the horizontal channel being traced by the beam is suddenly wiped out. Specifically, the channel or valley is terminated such that, at its end, a steep wall of fluid rises from the valley floor to the elevated surface of the fluid. Conversely, where the beam abruptly goes from a region of low green modulation to high green modulation, a horizontal channel is suddenly initiated by the beam such that, at its beginning, a steep wall of fluid exists between the elevated surface of the fluid and the floor of the valley at its beginning. In both instances, this wall causes refraction of light in a horizontal plane; that is, light entering the fluid from the vacuum is refracted at the surface of the wall in the same direction as that due to diffraction of red and blue light. A slight amount of refraction would be insufficient to cross-couple extraneous light into the green image since the refracted light would be blocked by vertical bars 76 in output mask 18 shown in FIG. 2. However, the angle of refraction is dependent upon the slope of the wall; that is, the larger the slope the greater the angle of refraction. If the angle of refraction is sufficiently large, red, blue, or magenta light will be deviated through vertical slots 75 in output mask 18 and will therefore appear in the displayed image. Since this refraction is essentially due entirely to a green transition, or change in color to or from green, the red, blue or magenta light thus appearing in the green image is entirely spurious and undesirable. Where the green transitions are separated by relatively large distances, the amount of refracted red, blue or magenta light appearing in the green image is relatively slight; however, where a number of green transitions occur within a relatively small area of the image, such as in the case of display of small green alphanumerics or point objects, the amount of refracted red, blue or magenta light appearing in the green image can become objectionable.

It has been found that by limiting the slope of the wall at the beginning or end of the portion of the electron beam trace producing green light, the amount of deviation of refracted red, blue and magenta light can be limited so as to cause the refracted light to be blocked by the vertical bars of output mask 18. This improvement is due to the reduced angle of refraction introduced by each sloping wall of fluid at the beginning or end of an electron beam tracing producing green light.

Figure 3:
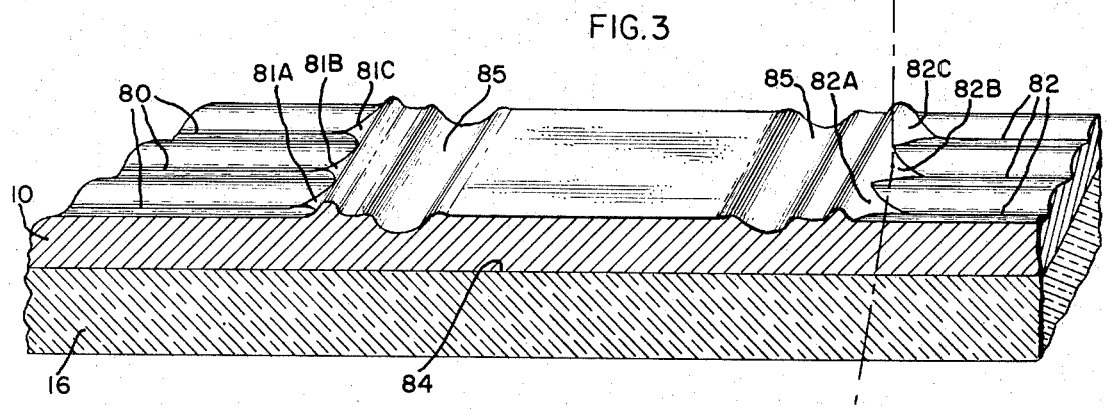
FIG. 3 is an isometric view of a portion of the light modulating medium employed in the projection system of FIG. 1.

Thus, as illustrated in FIG. 3, horizontal grooves 80 terminate at walls 81A, 81B and 81C, and resume at walls 82A, 82B and 82C, respectively, assuming the electron beam (not shown) is sweeping from left to right. These walls thus occur in horizontal grooves 80 at locations representing green transitions in the displayed image. Each of walls 81A, 81B, 81C, 82a, 82B and 82C extends transversely to the longitudinal direction of horizontal grooves 80; that is, the walls extend in the vertical direction. A beam of light 83 entering fluid 10 atop disk 16 is refracted by the interface with vacuum of the wedge of fluid existing between the surface 84 of disk 16 adjacent fluid 10 and defined by a wall at a location representing a green transition in the displayed image, such as wall 81B, for example. This refraction occurs in the same direction as diffraction of red and blue light caused by gratings running essentially perpendicular to gratings 80. For a more complete illustration of the type of deformation occurring in fluid 16, two channels 85 of the red and blue diffraction gratings extending in a vertical direction are also depicted in FIG. 3.

Figure 4:
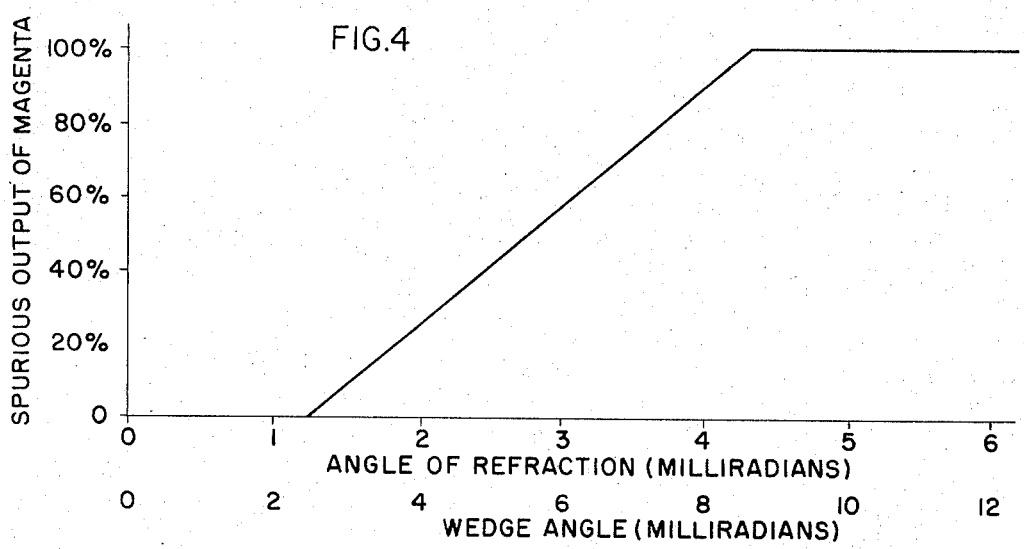
FIG. 4 is a graphical illustration of the amount of spurious magenta light appearing in green images due to refraction by the light modulating medium in the projection system of FIG. 1.

The relationship of the angle of refraction of magenta light to the spurious magenta light produced in the displayed image is illustrated in FIG. 4. From FIG. 4, it is evident that, where a wedge of fluid exists, holding the angle of refraction below approximately 1.2 milliradians will keep spurious magenta light from being cross-coupled into displayed green images. The relationship between wedge angle, or angle between the sloping wall at the beginning or end of an electron beam tracing producing green light, and the lower surface of the fluid on which the incident light impinges, is approximately $$\alpha \text{ light deviation} = \alpha \text{ wedge } (N_1/N_2 - 1)$$

where $\alpha$ represents the angle designated by its subscript, $N_1$ is the index of refraction in fluid, and
$N_2$ is the index of refraction in vacuum.

Therefore, where the fluid deformable medium has an index of refraction of 1.5, and since $N_2$ is 1, $\alpha$ light deviation = $\alpha$ wedge (.5). Thus the light deviation angle is substantially one half of the wedge angle. Accordingly, if the maximum wedge angle can be kept below 2.4 milliradians, no spurious red, blue, or magenta light due to cross-coupling will be visible in green images. For larger wedge angles, visibility of cross-coupled spurious light increases linearly, reaching its worst condition at 8.8 milliradians where 100 percent of the refracted magenta light contributes to the spurious image.

For an electron beam horizontal tracing rate of 1.1 inches in 52.2 microseconds, or about 535 microns per microsecond, the threshold wedge angle of 2.4 milliradians corresponds to a depth variation of 1.28 microns over a 535 micron groove length, or a groove depth slewing rate of 1.28 microns per microsecond. Full green vertical diffraction for a highlight image occurs with a groove depth of about 0.5 microns peak or 0.32 microns average. If full modulation of the green image from black to highlight occurs for a 1 volt excursion of the green video signal, then the threshold slewing rate of 1.28 microns per microsecond is reached if the video signal is changing at about 1.28/0.32 or 4 volts per microsecond. Full cross-coupling into the green image would occur at about 15 volts per microsecond slewing rate of the green video signal, or higher. To limit red, blue and magenta cross-coupling into the green image to tolerable levels, the allowable slew rate of the green video signal can be somewhat over the threshold 4 volts per microsecond, but must be substantially less than the worst case of 15 volts per microsecond.

Figure 5:
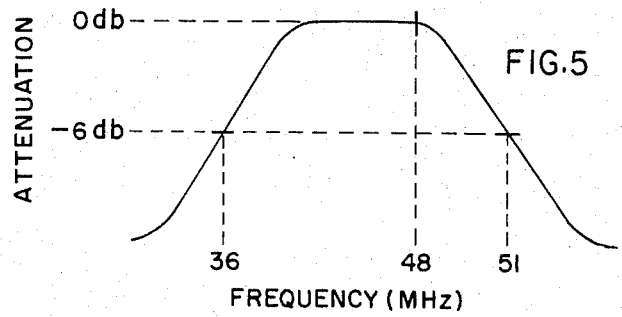
FIG. 5 is an illustration of the passband of the electrical filter employed at the output of the green modulator in the projection system of FIG. 1.

In order to limit the amount of red, blue and magenta cross-coupling into the green image, it has been found most effective to allow the green video signal to remain wide-band and to alter the bandwidth of the output signal from modulator 42 by use of filter 30, as illustrated in FIG. 1. The frequency of green wobble frequency source 41 is typically 48 MHz, so that the response curve of filter 30 is as shown in FIG. 5. The center frequency of the 48 MHz carrier is situated near one edge of the substantially unattenuated band, allowing both sidebands to be passed with less than 6 decibels attenuation over a modulation frequency range of ± 3 MHz. Beyond this range of modulating frequencies, the modulated green signal gradually shifts to single sideband. Because the energy in one of the sidebands is attenuated at the higher green video frequencies, the depth of grooves formed in the deformable medium by the 48 MHz carrier are limited at the higher green video frequencies and the slewing rate at discontinuities in the horizontal grooves is likewise limited. As a result, the slope of the walls at such discontinuities is limited, minimizing the amount of magenta light cross-coupled into green portions of the displayed images by refraction at the discontinuities.

From a gain and radio frequency output capability standpoint, it is preferable to tune the center frequency of the bandpass filter downward such that the 48 MHz frequency is at the higher frequency corner of the filter response curve, as shown in FIG. 5. This is because higher frequencies tend to become attenuated more readily and hence require application of techniques to minimize such attenuation. However, similar improvements in green image resolution and freedom from red, blue and magenta cross-coupling are observed if the center frequency of the filter is raised such that the 48 MHz frequency carrier is at the lower frequency corner of the filter response curve.

As an alternative to the embodiment illustrated in FIG. 1, filter 30 may be omitted so that the output of modulator 42 is directly coupled to the input of push-pull amplifier 44, and the slewing rate of the green video signal may be limited prior to modulation of the 48 MHz carrier. This can be accomplished by employing an operational amplifier having a predetermined minimum response time for a predetermined amplitude of signal excursion in the output circuitry of green video signal source 40, of configuration shown in FIG. 6. This minimum response time, which may be adjustable, serves to limit the slew rate of the green video signal to less than a maximum value. Thus, in FIG. 6, a pair of NPN transistors 100 and 101 have their emitters directly connected to the drain of a field effect transistor 102 having its gate and source electrodes connected to a negative voltage source. Base bias is supplied to each of transistors 100 and 101 across resistances 103 and 104, respectively. Positive collector bias is furnished to transistor 100 through a resistance 105, while the collector of transistor 101 is directly connected to a positive voltage source. Transistors 100 and 101 function as a differential amplifier when input signals are supplied to their respective bases.

Output signals from the collector of transistor 100 are furnished to the base of PNP transistor 106 across a capacitor 107 connected to ground. Capacitor 107, if desired, may be made adjustable. Positive emitter bias is furnished to transistor 106 through a resistance 108, while the collector of transistor 106 is connected directly to the base of an NPN transistor 110 and through normally forward biased diodes 112 to the base of a PNP transistor 111. Negative cathode bias is supplied to diodes 112 through a resistance 113. Positive collector bias is supplied to transistor 110 through a resistance 114, while negative collector bias is supplied to transistor 111 through a resistance 115.

Figure 6:
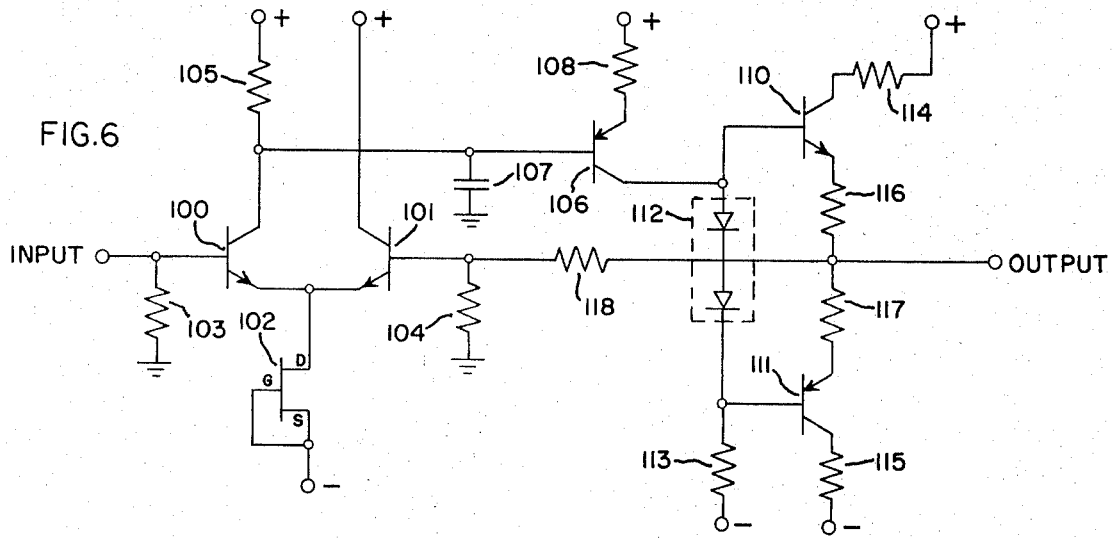
FIG. 6 is a schematic diagram of an alternative embodiment of the apparatus furnishing green signals to the light valve employed in the projection system of the invention.

Outputs signals from the circuit of FIG. 6 are furnished from the emitters of transistors 110 and 111 through a pair of load resistances 116 and 117, respectively, to a common output terminal. A feedback resistance 118 is connected between the output terminal and the base of transistor 101.

Field effect transistor 102 functions as a constant current source in a well-known manner; that is, with the gate and source electrodes maintained at sufficient, essentially identical negative potential with respect to the drain electrode, the device is maintained in its pinch-off condition which is the condition at which the channel conductance is dependent upon drain-to-gate potential. Thus, any increase or decrease in drain-to-gate potential tends to decrease or increase, respectively, the channel conductance and thereby maintain the drain-to-source current at an essentially constant level.

In operation, assume a signal having a waveform that abruptly goes positive at a rate exceeding the maximum tolerable slew rate is applied to the base of transistor 100. Capacitor 107, having been charged to a positive potential essentially equal to the collector voltage on transistor 100, discharges at an essentially constant rate through transistors 100 and 102, due to the constant current characteristics of transistor 102. The rate at which capacitor 107 discharges controls the rate at which collector voltage on transistor 106 swings negative. The negative voltage swing on the collector of transistor 106 drives the base of transistor 110 negative, causing a positive-going increase in voltage on the emitter of transistor 110 which similarly appears, in slightly diminished amplitude due to presence of resistance 116, at the output terminal of the circuit.

The negative voltage swing on the collector of transistor 106 also drives the base of transistor 111 in a negative direction. This causes a decrease in collector-to-emitter impedance of transistor 111, producing a positive-going increase in voltage on the emitter of transistor 111 which similarly appears, in slightly diminished amplitude due to presence of resistance 117, at the output terminal of the circuit. Preferably transistors 110 and 111 are of substantially matched complementary configuration, with resistances 114 and 115 being of substantially equal ohmic value and resistances 116 and 117 being of substantially equal ohmic value so that the voltage swings across resistances 116 and 117 are essentially equal in amplitude and opposite in polarity to each other. Diodes 112, comprising a dual diode, provide bias for transistors 110 and 111 so that no distortion is present during zero cross-over switching. This is because both transistor 110 and 111 are conducting at zero input voltage due to the bias presented by diodes 112. Since at least one or the other of transistors 110 and 111 is essentially conductive at any time, a relatively low impedance path extends from the output terminal of the circuit through the emitter-to-collector circuit of the conductive one of transistors 110 and 111.

Output signals produced by the circuit are returned to the base of transistor 101 at an amplitude reduced by the voltage divider action of resistances 118 and 104. The negative feedback loop thus formed to the differential amplifier comprised of transistors 100 and 101 serves to reduce and stabilize the gain of the circuit, since voltage applied to the base of transistor 101 from the output of the circuit tends to counteract the effect of the input signal thereto. For example, a positive-going voltage from the output of the circuit, resulting from a positive-going input signal applied to the circuit, serves to decrease collector-to-emitter resistance of transistor 101 when applied to the base thereof. This increases collector-to-emitter current flow through transistor 101 and, since transistor 102 tends to maintain constant current therein, collector-to-emitter current flow through transistor 100 decreases.

Thus, capacitor 107, by limiting the slew rate of the signal supplied to the base of transistor 106, serves to limit the slew rate of the output signal produced by the operational amplifier circuit of FIG. 6 and thereby controls the response time of the circuit for any predetermined amplitude of input signal excursion. The slew rate limiting action of the circuit is applied equally to both positive-going and negative-going input signals.

Figure 7:
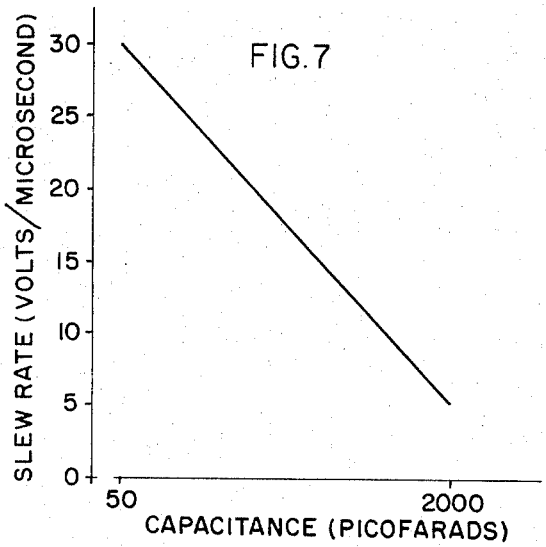
FIG. 7 is a graphical illustration of the effect of changing capacitance in the apparatus shown in FIG. 6 upon the horizontal slewing rate of the green video signal.

FIG. 7 illustrates the effect of the size of capacitor 107 on slew rate. It can be seen, from FIG. 7, that as the size of capacitor 107 is increased, the slew rate of the green video signal decreases. By employing the operational amplifier circuit of FIG. 6, it can be seen from FIG. 7 that the slew rate of the green video signal can be made to decrease substantially linearly over a range of capacitance, such as 50 to 2,000 picofarads.

The embodiment of FIG. 1 is deemed preferable to that of FIG. 6 since nonlinear stages subsequent to capacitor 70 of FIG. 6, such as a black level clipper for example, may tend to reinsert higher slewing rate transitions. By limiting the video frequency passband just prior to application of the radio frequency signal to push-pull amplifier 44, as shown in FIG. 1, the slew rate is limited regardless of whether it was due to the information content of the green video signal or was introduced in any of the nonlinear green video signal processing stages.

The foregoing describes a method and apparatus for reducing cross-coupling of red, blue or magenta light in green portions of the image produced by a light valve video projector employing diffraction gratings of orthogonal orientation to produce colored images for display. The invention limits the effect of light horizontally refracted through the sloping walls at either end of interactions and disturbances in a horizontal diffraction grating upon light diffracted vertically by the grating in the light valve of the video projector. The minimization of cross-coupled red, blue or magenta light in green portions of the image is accomplished by limiting the horizontal slewing rate of the green video signal in the light valve video projector.

While only certain preferred features of the invention have been shown by way of illustration, many modifications and changes will occur to those skilled in the art. It is, therefore, to be understood that the appended claims are intended to cover all such modifications and changes as fall within the true spirit of the invention.

We claim:

1. In an optical projection system wherein an image to be displayed in color is formed by impingement of an electron beam on a deformable light modulating medium situated between the input mask and output mask of a Schlieren optics system, said electron beam forming optical diffraction gratings in the form of grooves in said medium extending in a first direction representing first and second primary colors and extending in a second direction representing a third primary color, said optical projection system including a source of light comprised of said first, second and third primary colors directed through transparent regions of said input mask onto said diffraction gratings and thence onto said output mask, the method of displaying at least portions of images in said third primary color without substantial cross-coupling of either of said first and second primary colors therein comprising:

limiting to less than a predetermined value the slope of walls in said medium occurring at locations in said grooves extending in said second direction and representing transitions in said third primary color of said image, said walls extending in said first direction such that light refracted by said walls is blocked by said output mask.

2. The method of claim 1 wherein said electron beam is deflected in accordance with each of first, second and third amplitude modulated signals representative of said first, second and third primary colors, respectively, and wherein the step of limiting to less than a predetermined value the slope of said walls comprises filtering said third amplitude modulated signal so as to block a portion of one electrical sideband thereof.

3. The method of claim 1 wherein the step of limiting to less than a predetermined value the slope of said walls comprises oscillating said electron beam in said first direction in accordance with a signal representing said third primary color and limiting the slew rate of said signal to less than a maximum value.

4. The method of claim 3 wherein the step of limiting the slew rate of said signal to less than a maximum value comprises amplitude modulating said signal onto a constant frequency carrier and filtering the amplitude modulated signal thereby produced so as to block a portion of one electrical sideband thereof.

5. The method of claim 3 wherein the step of limiting the slew rate of said signal to less than a maximum value comprises amplifying said signal in an amplifier having a predetermined minimum response time for a predetermined amplitude of signal excursion.

6. In an optical projection system wherein an image to be displayed in color is formed by impingement of an electron beam on a deformable light modulating medium situated between the input mask and output mask of a Schlieren optics system, said electron beam being deflected over the surface of said medium in one direction in accordance with each of first and second amplitude modulated signals so as to form optical diffraction gratings in said medium representing first and second primary colors respectively, said optical projection system including a source of light comprised of said first and second primary colors and a third primary color directed through transparent regions of said input mask onto said diffraction gratings and thence onto said output mask, the method of displaying at least portions of images in said third primary color without substantial cross-coupling of either of said first and second primary colors therein comprising:

providing a third amplitude modulated signal having a portion of one electrical sideband thereof attenuated; and deflecting said electron beam over the surface of said medium in a second direction in accordance with said third amplitude modulated signal so as to form an optical diffraction grating in said medium representing said third primary color.

7. In an optical projection system wherein an image to be displayed in color is formed by impingement of an electron beam on a light modulating medium situated between the input mask and output mask of a Schlieren optics system and including electron beam deflecting means for influencing the path of said electron beam, first circuit means coupled to said electron beam deflecting means and amplitude modulating a first signal onto a first carrier of frequency representing a first primary color so as to produce a signal consisting essentially of said first carrier frequency and the upper sideband thereof, and second circuit means coupled to said electron beam deflecting means and amplitude modulating a second signal onto a second carrier of frequency representing a second primary color so as to produce a signal consisting essentially of said second carrier frequency and the lower sideband thereof, said electron beam being deflected over the surface of said medium in one direction in accordance with each of said first and second signals so as to form optical diffraction gratings on said medium representing said first and second primary colors respectively and in a second direction in accordance with a third signal so as to form an optical diffraction grating on said medium representing a third primary color, said optical projection system including a source of light comprised of said first, second and third primary colors directed through transparent regions of said input mask onto said diffraction gratings and thence onto said output mask, the improvement wherein said first and second primary colors are prevented from being substantially cross-coupled into at least a portion of an image displayed in said third primary color, comprising:

third circuit means coupled to said electron beam deflecting means and amplitude modulating said third signal onto a third carrier of frequency representing said third primary color so as to produce a signal consisting essentially of said third carrier frequency, an entire one of two sidebands thereof, and only a portion of the other one of said two sidebands thereof.

8. The apparatus of claim 7 wherein said third circuit means comprises amplitude modulating means receiving said third signal and said third carrier, and electrical filter means coupling said amplitude modulating means to said electron beam deflecting means.

9. The apparatus of claim 7 wherein said third circuit means comprises amplitude modulating means receiving said third carrier, and amplifier means having a predetermined minimum response time for a predetermined amplitude of signal excursion and receiving said third signal, said amplifier means limiting the slew rate of said third signal and furnishing a slew rate limited output signal to said amplitude modulating means, the output of said amplitude modulating means being coupled to said electron beam deflecting means.

* * * * *